United States Patent
Kato et al.

(10) Patent No.: US 10,030,725 B2
(45) Date of Patent: Jul. 24, 2018

(54) BRAKE LINING FOR RAILROAD CAR

(75) Inventors: Takanori Kato, Osaka (JP); Atsushi Sakaguchi, Osaka (JP); Kazutaka Asabe, Osaka (JP); Takashi Maejima, Kyoto (JP); Satoru Nakano, Kyoto (JP); Takeshi Nakano, Kyoto (JP)

(73) Assignees: NIPPON STEEL & SUMITOMO METAL CORPORATION, Tokyo (JP); FINE SINTER CO., LTD., Aichi (JP)

(*) Notice: Subject to any disclaimer, the term of this patent is extended or adjusted under 35 U.S.C. 154(b) by 135 days.

(21) Appl. No.: 13/605,004

(22) Filed: Sep. 6, 2012

(65) Prior Publication Data

US 2012/0325598 A1 Dec. 27, 2012

Related U.S. Application Data

(63) Continuation of application No. PCT/JP2011/055783, filed on Mar. 11, 2011.

(30) Foreign Application Priority Data

Mar. 11, 2010 (JP) .................................. 2010-054678

(51) Int. Cl.
*F16D 65/092* (2006.01)
*B61H 5/00* (2006.01)

(52) U.S. Cl.
CPC .............. *F16D 65/092* (2013.01); *B61H 5/00* (2013.01)

(58) Field of Classification Search
CPC .............. F16D 69/0408; F16D 65/0979; F16D 2069/0433
USPC .............................. 188/250 G, 250 B, 250 E
See application file for complete search history.

(56) References Cited

U.S. PATENT DOCUMENTS

| | | | | | |
|---|---|---|---|---|---|
| 2,129,372 | A | * | 9/1938 | Gamble | 192/107 C |
| 2,806,570 | A | * | 9/1957 | Markus | 192/107 R |
| 2,986,252 | A | * | 5/1961 | Du Bois | 192/107 M |
| 3,209,876 | A | * | 10/1965 | Kraft | 192/107 R |
| 3,616,880 | A | * | 11/1971 | Shellhause | 188/79.56 |
| 3,809,200 | A | * | 5/1974 | Smales | 192/107 C |
| 3,970,174 | A | * | 7/1976 | Kirkhart | 188/251 A |

(Continued)

FOREIGN PATENT DOCUMENTS

| EP | 263752 A2 * | 4/1988 |
|---|---|---|
| EP | 1 318 321 | 6/2003 |

(Continued)

*Primary Examiner* — Bradley T King
(74) *Attorney, Agent, or Firm* — Clark & Brody

(57) ABSTRACT

A brake lining for a railroad car has a frictional surface on a brake disc that is pressed by a brake caliper. Friction bodies are pressed against the frictional surface of the brake disc and a back plate is mounted to the caliper to support the friction bodies. Each of the friction bodies is formed with a friction material which contacts the brake disc frictional surface, and has a base plate attached on the back plate side of the friction material. The base plate has a protrusion formed on its back side. On the friction body side of the back plate there is formed a groove which contacts the protrusion formed on the base plate. A disc spring or a spherical-seated structure is disposed between the base plate of each friction body and the back plate. Friction bodies are prevented from rotating at their attached places, without adding new components.

3 Claims, 2 Drawing Sheets

(56) References Cited

U.S. PATENT DOCUMENTS

| | | | | |
|---|---|---|---|---|
| 4,350,231 | A * | 9/1982 | Crossman et al. | 188/218 XL |
| 4,533,032 | A * | 8/1985 | Lamarche | 192/107 M |
| 5,135,094 | A * | 8/1992 | de Briel et al. | 192/107 R |
| 8,215,461 | B2 * | 7/2012 | Holme et al. | 188/250 G |
| 8,544,617 | B2 * | 10/2013 | De Soccio | 188/235 |
| 2009/0152058 | A1 * | 6/2009 | Thorp | 188/250 G |
| 2013/0105258 | A1 * | 5/2013 | Sigl et al. | 188/251 R |

FOREIGN PATENT DOCUMENTS

| | | |
|---|---|---|
| EP | 2 085 637 | 8/2009 |
| GB | 768 510 | 2/1957 |
| JP | 48-16044 | 5/1973 |
| JP | 61-173819 | 10/1986 |
| JP | 11-247821 | 9/1999 |
| JP | 2006-207625 | 8/2006 |
| JP | 2006-275230 | 10/2006 |
| JP | 2008-133948 | 6/2008 |
| JP | 2008-151188 | 7/2008 |
| JP | 2008-309319 | 12/2008 |
| JP | 2009-041583 | 2/2009 |
| JP | 3149665 | 4/2009 |

\* cited by examiner

BRAKE LINING FOR RAILROAD CAR

TECHNICAL FIELD

The present invention relates to a brake lining for a railroad car, primarily in a disc brake for a railroad car, which makes it possible to increase durability, by effectively distributing thermal energy caused by friction between the brake disc and the brake lining.

BACKGROUND ART

With the increased speed and loading of land transportation machinery such as railroad cars and automobiles, as well as motor bicycles and the like, disc brakes have come to be widely used as braking devices for such vehicles.

Following is a description of an example of a disc brake used for a railroad car.

A disc braking system is a device which produces a braking force by means of friction between a brake disc and a brake lining, and which operates by pressing the brake lining on a frictional surface of the brake disc mounted onto an axle or a wheel so as to produce a braking force and thereby control the speed of a vehicle by reducing the revolution of the axle or the wheel.

When it works, the temperature of a contact surface of the brake lining and the brake disc rises due to a frictional heat, and the temperature of the contact surface tends to increase, because the braking force increases as the speed increases or as the weight of the vehicle increases.

Consequently, there is a need to make a contact between the brake lining and the brake disc as uniform as possible during braking, and to reduce the frictional heat, so as to increase the durability of the brake disc.

FIG. 3 shows a brake lining and a brake disc of a conventional disc brake for a railroad car. FIG. 3 (*a*) is a planar view of a brake lining as seen from the side of a friction body, and FIG. 3 (*b*) is a sectional view along line B-B in FIG. 3 (*a*).

A brake lining 1 is mounted to a brake caliper (not pictured), and has a component such that a friction body 1*a*, which makes contact with a frictional surface 2*a* of a brake disc 2, is mounted to a back plate 1*b* by means of a rivet (not pictured).

A brake caliper is a device which presses the brake lining into contact with the brake disk to produce a braking force by a hydraulic or an air pressure. A pressing force by the brake caliper onto the brake lining is not distributed uniformly on the entire brake lining, but rather, it concentrates on an area where the pressing force is applied, due to the mounting structure between brake lining and brake caliper.

Accordingly, the conventional disc brake has a structure such that the pressing force applied by the brake caliper concentrates only a small area of the brake lining. As a consequence, a significant difference arises between areas of high and low contact pressure of the brake lining and the brake disc, and the contact pressure between the brake lining and the brake disc tends to increase at the area where the pressing force from the brake caliper operates.

In particular, in the case of a high-speed railroad car such as a bullet train, temperature of the brake lining and the brake disc during braking is probably very high, because of increased thermal energy due to friction in areas of high contact pressure. When the temperature rises due to larger contact pressure, the amount of wear increases between the brake lining and the brake disc, and this can cause cracks in the brake disc. It is therefore important to efficiently distribute the thermal energy resulting from friction between these two parts during braking in order to ensure durability of the brake linings and brake discs.

In response to this problem, in recent years, structures have been disclosed for brake linings which aim to achieving uniform contact (uniform contact pressure) between the brake lining and the brake disc (for example, Patent References 1-3).

The brake linings disclosed in Patent References 1-3 have friction bodies divided into a plurality of members and each of the respective friction bodies employ springs or spherical-seated bearings so that they are able to rotate. As a result of such a structure, it becomes possible to achieve a uniform contact pressure between the brake lining and the brake disc.

However, since the each friction bodies are smaller in size, the friction bodies tend to rotate at their attached places due to friction against the brake disc. As a result, members which fasten the friction bodies to a back plate loosen, and there is a possibility that the friction bodies will ultimately fall off.

Therefore, the brake linings disclosed in Patent References 2 and 3 are provided with detent mechanisms. However, the detent mechanisms disclosed in Patent References 2 and 3 require new components other than the friction bodies, springs or spherical-seated bearings, back plates, and fastening components such as rivets, which are needed for the brake linings to achieve uniform contact pressure. Consequently, this increases the likelihood of greater weight and reduced productivity. Moreover, in the structures disclosed in Patent References 2 and 3, there is a possibility that durability of the components cannot be sufficiently ensured, because a torque load is applied to the components used for the detent mechanisms.

PRIOR ART REFERENCES

Patent References

Patent Reference 1: Japanese Patent Application Kokai Publication No. 2008-151188
Patent Reference 2: Japanese Patent Application Kokai Publication No. 2006-207625
Patent Reference 3: Japanese Patent Application Kokai Publication No. 2008-133948

SUMMARY OF THE INVENTION

Problems to be Solved by the Invention

The problem which the present invention aims to solve is that in the prior art technology, new components were needed to achieve a uniform contact pressure between the brake lining and the brake disc to thereby prevent temperature from local increase in contact surface, which increased the likelihood of higher weight and reduced productivity. Moreover, a torque load was applied to the components used for the detent mechanisms, so another problem is the possibility that durability of the components could not be sufficiently ensured.

Means for Solving this Problem

The brake lining for a railroad car according to the present invention is a brake lining for a railroad car which is pressed by a brake caliper against a frictional surface of a brake disc.

In order to prevent friction bodies from rotating at their attached places, without adding new components, the brake lining comprises friction bodies pressed against the frictional surface of the brake disc, and a back plate mounted to the caliper so as to support the friction bodies.

The friction bodies are distributed such that two or more thereof are arranged in a radial direction and in a circumferential direction of the brake disc. Each of these friction bodies is formed with a friction material which contacts the frictional surface of the brake disc, and with a base plate attached on the back plate side of the friction material. The base plate has a protrusion formed on the back plate side, and on a side of the friction body, the back plate is formed with a groove which contacts the protrusion formed on the base plate. An elastic element or a spherical-seated bearing is disposed between the base plate of each friction body and the back plate.

According to the present invention, a protrusion is formed on the back plate side of the base plate which is mounted to the back plate side of the friction material which contacts the frictional surface of the brake disc, and a groove which contacts the protrusion formed on the base plate is formed on the friction body side of the back plate. Detent of the base plate is achieved through contact between the protrusions and the groove.

It is therefore possible to prevent the friction bodies from rotating at their attached places, without adding new components.

Advantageous Effects of the Invention

According to the present invention, the friction bodies can be prevented from rotating at their attached places, without adding new components, because a protrusion is formed on the back plate side of the base plate, and a groove which contact the protrusion is formed on the friction body side of the back plate, thereby providing a detent mechanism when the protrusion and groove come into contact.

PREFERRED EMBODIMENT

According to the present invention, the object of preventing the friction bodies from rotating at their attached places, without adding new components, is achieved by forming protrusions on the back plate side of the base plate, and also forming grooves which contact the protrusions on the friction body side of the back plate, so that the protrusions and the grooves come into contact with each other.

EXAMPLES

The preferred embodiment of the present invention is described below, along with the process from conceptualizing the present invention to solving the problem of the prior art.

Sintered copper materials or resin-based materials are typically employed in friction bodies, and a thin steel plate called as a base plate is caused to adhere to the surface on the back plate side, in order to maintain strength and rigidity. The present inventors realized that if this base plate were given a detent function, then it would be possible to prevent the friction bodies from rotating at their attached places, and it would also be possible to inhibit loosening of the members which fasten the friction bodies to the back plate, without adding new components.

The present inventors conducted careful research based on the above concept, and thereby devised the brake lining for a railroad car of the present invention.

Figure 1:
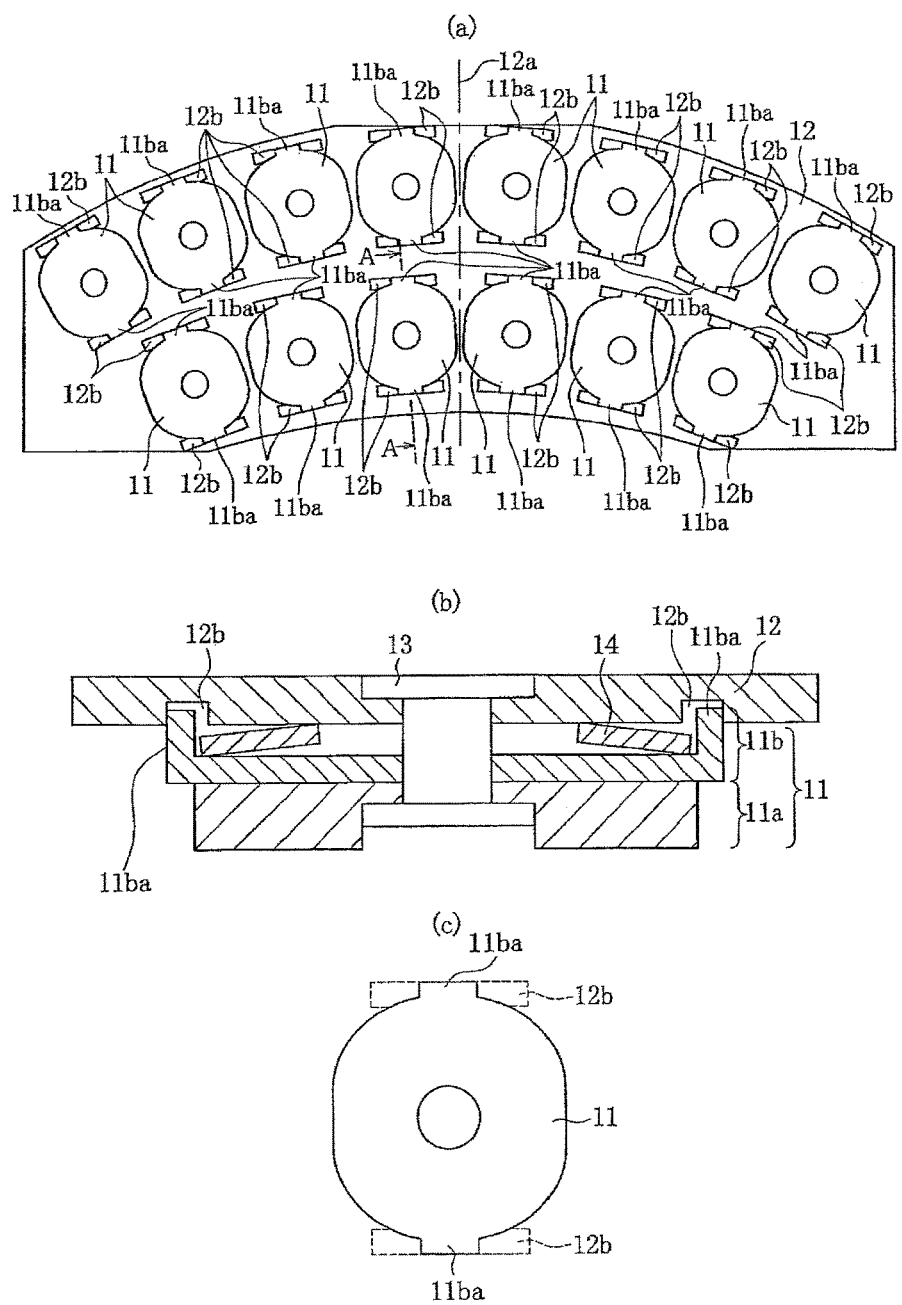
FIG. 1 (a) is a planar view illustrating the first example of the brake lining according to the present invention as seen from the friction body side, FIG. 1 (b) is an enlarged sectional view along the line A-A in FIG. 1 (a), and FIG. 1 (c) is a planar view illustrating the base plate, as viewed from the back plate side.

The brake lining for a railroad car of the present invention is pressed by a brake caliper against, for example, a frictional surfaces of brake discs mounted onto an axle, or brake discs mounted onto a wheel by bolt connection and has the following configuration:

In FIG. 1, Reference Numeral 11 is a friction body which is pressed onto the frictional surface of a brake disc. The friction body 11 is elastically supported by a back plate 12 which is mounted to the brake caliper by a rivet 13, for example, and with a disc spring 14 disposed between the friction body 11 and the back plate 12.

Figure 2:
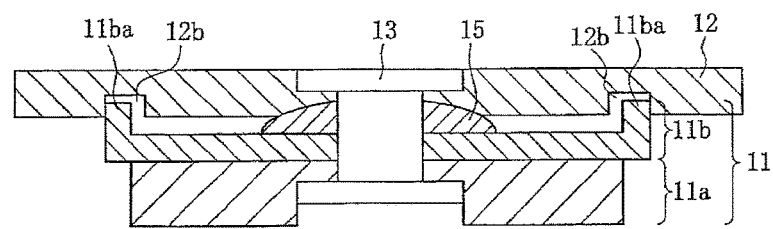
FIG. 2 is a drawing illustrating the second example of the brake lining according to the present invention viewed in a manner similar to FIG. 1 (b).
Figure 3:
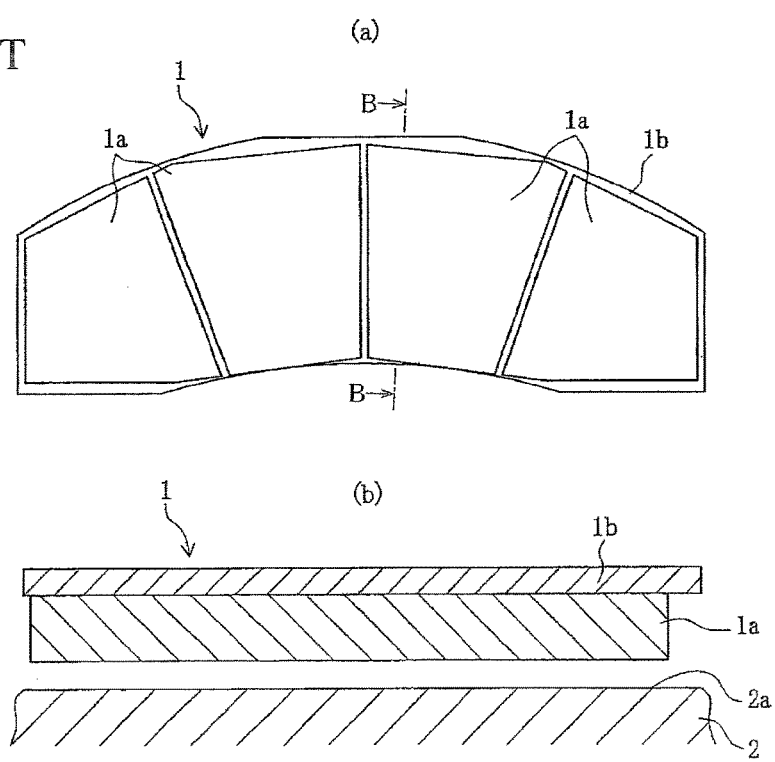
FIG. 3 (a) is a planar view illustrating a prior art brake lining, as viewed from the friction body side, and FIG. 3 (b) is an enlarged sectional view along the line B-B in FIG. 3 (a).

Instead of the disc spring 14, the elastic element disposed between the friction body 11 and the back plate 12 may be a coil spring. Moreover, instead of using the elastic element, a spherical-seated structure 15 may be interposed, as shown in FIG. 2.

The friction bodies 11 are divided into two members in the radial direction of the brake disc, as illustrated in FIG. 1 (a), for example. The friction bodies 11 are divided into eight members on the outer side in the circumference direction, and into six members on the inner side in the circumference direction, for a total of fourteen friction bodies, and they are symmetrically arranged in the circumference direction of the back plate 12 with respect to a central line 12a.

According to the present invention, protrusions 11ba are formed, on the side of the back plate 12, for example, in two places on the outer periphery of the base plate 11b which forms each of the divided friction bodies 11. The base plate 11b is attached on the side of the back plate 12 of a friction material 11a which contacts the frictional surface of the brake disc.

The protrusion 11ba formed on the base plate 11b engages at a position corresponding to the protrusion 11ba on the friction body 11 side of the back plate 12, where there is formed a groove 12b which contacts the outer peripheral surface of the protrusion 11ba.

The groove 12b may have any shape, as long as it is able to secure a contact surface area with the outer peripheral surface of the protrusion 11ba. However, it is advantageous to provide a small space between the protrusion 11ba and the groove 12b within a range that allows a sufficient detent function, in order to make it possible for the friction body 11 to move in a direction perpendicular to the frictional surface of the brake disc (the axial direction of the brake disc). The space between the protrusion 11ba and the groove 12b should be on the order of within 1 mm.

If such a structure is employed, the divided friction bodies 11 will not rotate at their attached places while braking is being effected due to contact resistance between the outer peripheral surface of the protrusions 11*ba* and the grooves 12*b*, even in cases where the friction bodies 11 are pressed against the frictional surfaces of the brake discs.

Therefore, if this structure is employed, the members (the rivets 13) which fasten the friction bodies 11 to the back plate 12 do not readily loosen, and there is less of a possibility that the friction bodies 11 will fall off. In addition, this structure makes it possible to keep the overall weight from increasing, because an increase in weight due to the protrusions 11*ba* is cancelled out by a decrease in weight due to the grooves 12*b*.

The installation position of the protrusions 11*ba* and the grooves 12*b* is advantageously determined by a line which is normal to the outer peripheral surface of the protrusions 11*ba* and the contact surfaces of the grooves 12*b*, and is, for example, in the radial direction of the brake disc, as shown in FIG. 1 (*a*).

If the protrusions 11*ba* and the grooves 12*b* are provided in such positions, the brake torque which operates in the circumferential direction of the brake disc no longer applies a direct load onto the protrusions 11*ba* or the grooves 12*b*, when the detent mechanism operates on the brake disc. It is therefore possible to prevent a decrease in durability resulting from an applying over loading on the protrusions and the grooves.

Studies conducted by the present inventors have indicated that a line normal to the contact surface between the protrusions 11*ba* and the grooves 12 does not necessarily have to be in the radial direction of the brake disc. Rather, the protrusions 11*ba* and the grooves 12 may be provided within a range of about ±10° of the radial direction.

It was determined that if they are provided within this range, it is possible to ensure sufficient durability, due to the fact that the rivet 13 and the back plate 12 receive the brake torque which is applied in the circumferential direction of the brake disc.

On the other hand, if the protrusions 11*ba* and the grooves 12 are provided such that a line normal to a plane at which the outer peripheral surface of the protrusions 11*ba* and the grooves 12*b* come into contact with each other is in a position in the circumferential direction of the brake disc, then the brake disc torque is applied directly on the protrusions 11*ba*, making it no longer possible to ensure the durability of the protrusions 11*ba*.

In order to ensure a sufficient detent effect and durability of the protrusions 11*ba*, it is desirable for the contact surface area between the outer peripheral surface of the protrusions 11*ba* and the grooves 12*b* to be at least 10 mm$^2$ per friction body.

Following is a description of the results of finite element analyses conducted to evaluate the rotation of the friction bodies during braking, so as to confirm the advantageous effects of the present invention.

In the finite element analysis were used a brake lining with a length of 400 mm and a width of 130 mm with a shape and structure shown in FIG. 1 and FIG. 2, and an almost ring-shaped forged steel brake disc with an inner diameter of 305 mm and an outer diameter of 720 mm, such as shown in the bullet trains, modeled in terms of an elastic body.

In the finite element analysis, a load (10 kN) corresponding to a pressing force from the brake caliper was applied from the back surface side of the brake lining, causing the brake disc to rotate.

At this time, the frictional surface contacting the brake lining was positioned on the outer peripheral side of the brake disc, and the length of the radial direction thereof was set at 127.5 mm. In addition, the frictional coefficient of the contact surface between the brake lining (steel, other than the friction material of the friction body, which was a sintered copper material) and the brake disc was set at 0.3.

An evaluation was carried out to determine whether or not the individual friction bodies rotated at this time. In the analysis, a comparison was made between a case in which there were protrusions in the base plate of the friction bodies shown in FIGS. 1 and 2 (the dimensions of the area of contact between the protrusions and the grooves was 10 mm in the peripheral direction and of the brake disc and 1 mm in the width direction) and a case in which there were no protrusions in the base plate (see TABLE 1 below).

TABLE 1

|  | Protrusions in Base Plate | Mechanism for Rotating the Friction Bodies | Number of Friction Bodies |
| --- | --- | --- | --- |
| Invention Example 1 | Present | Disc spring | 14 |
| Invention Example 2 | Present | Spherical-seated structure | 14 |
| Comparative Example | Not present | Disc spring | 14 |

Since the object of the present invention is to prevent rotation of the individual friction bodies of the brake lining, an evaluation was carried out to determine whether or not the individual friction bodies rotated at their attached places when a brake disc was caused to rotate in a state where a brake lining was pressed against the brake disc.

TABLE 2 below shows the number of friction elements in which rotation occurred for each of the respective brake linings

TABLE 2

|  | Number of Rotating Friction Bodies |
| --- | --- |
| Invention Example 1 | 0 |
| Invention Example 2 | 0 |
| Comparative Example | 4 |

As shown in TABLE 2, rotation did not occur in any of the friction bodies of the present invention, because the protrusions on the base plate came into contact with the grooves. However, in the case of the comparative example, 4 of the friction bodies rotated, because the base plate had no protrusions.

The present invention is not limited to the above-described examples, and the preferred embodiment may, of course, be advantageously modified within the scope of the technical ideas recited in the claims.

For example, the shape of the protrusion 11*ba* formed on base plate 11*b* is not limited to a rectangular shape as shown in FIG. 1 (*a*), but a variety of shapes may be used, such as a polygon or a circular shape. Moreover, the number of protrusions 11*ba* formed on the base plate 11*b* is not limited to two as shown in FIG. 1. However, if there are too many of them, the productivity decreases, so the number of protrusions 11*ba* is advantageously on the order of 1-4.

INDUSTRIAL APPLICABILITY

The present invention described above is not limited to use in brake discs for railroad cars, but it can also be used in brake discs for automobiles as well as motor bicycles and the like.

EXPLANATION OF THE REFERENCE SYMBOLS

11 Friction body
11a Frictional material
11b Base plate
11ba Protrusion
12 Back plate
12b Groove
13 Rivet
14 Disc spring
15 Spherical-seated structure

The invention claimed is:

1. A brake lining for a railroad car which is pressed by a brake caliper against a frictional surface of a brake disc, comprising:
    friction bodies pressed against the frictional surface of the brake disc; and
    a back plate mounted to the caliper so as to support the friction bodies, wherein the friction bodies are distributed such that two or more thereof are arranged in a radial direction and in a circumferential direction of the brake disc, and each of these friction bodies is formed with a friction material which contacts the frictional surface of the brake disc, and with a base plate attached to a surface of the friction material that opposes the back plate,
    the base plate having an outer peripheral side formed with a protrusion bent toward the back plate, and the back plate is formed with a groove on a surface that opposes the friction bodies such that the groove contacts the protrusion of the base plate,
    a line normal to a position where the protrusion touches the groove is not located in the circumferential direction of the brake disc, and rotation of the friction body is prevented by a frictional force between the protrusion and the groove,
    a space is provided between the protrusion and the groove, within a range that allows a detent function, to allow movement of the friction bodies in an axial direction of the brake disc, and
    an elastic element or a spherical-seated structure is disposed between the base plate of each friction body and the back plate.

2. The brake lining for a railroad car according to claim 1, wherein a position where the protrusion touches the groove is within a range of ±10° of a radial direction of the brake disc.

3. The brake lining for a railroad car according to claim 1, wherein a contact area between the protrusion and the groove is at least 10 mm² per friction body.

* * * * *